March 1, 1966     G. E. MORGAN     3,237,201

SUSPENSION MEANS

Filed March 4, 1964

INVENTOR
Gerard E. Morgan
By McDougall, Hersh & Scott
Att'ys

United States Patent Office 3,237,201
Patented Mar. 1, 1966

3,237,201
SUSPENSION MEANS
Gerard E. Morgan, Glenview, Ill., assignor to John T. Riddell, Inc., Chicago, Ill., a corporation of Illinois
Filed Mar. 4, 1964, Ser. No. 349,206
16 Claims. (Cl. 2—3)

This invention relates to suspension means of the type associated with protective gear. The invention is particularly concerned with protective gear of the type worn by athletes or by others engaged in activities where there is a likelihood that damaging force will be directed at the person.

There are many well-know applications for the use of protective gear. In the case of contact sports, such as football, the head, shoulders and other portions of the body are subject to the application of blows, and protection must be afforded to insure the safety of persons engaged in the sport. There are also other activities which require the use of protective headgear and other protective means.

Padding materials have been widely employed for the protection of individuals, and it is obvious that the amount of protection from the detrimental effects of blows is proportional to the thickness of the padding. Foam rubber or other resilient materials could be employed in extremely thick sections, and injury occasioned by direct impact could be virtually eliminated. It is obvious, however, that such an approach is impractical since permissible padding thicknesses are limited by space considerations and by the necessity of preserving freedom of movement.

In addition to the use of resilient materials, various arrangements of straps are employed in protective structures. Such arrangements are commonly employed in headgear, and they have proven successful to a substantial degree. It is, however, considered desirable to provide the greatest possible protection, particularly in the case of headgear since critical injuries can be incurred when severe impact conditions arise.

It is an object of the instant invention to provide an improved suspension means for use in protective equipment whereby the detrimental effects of impact can be greatly reduced or eliminated.

It is a further object of this invention to provide a suspension means which is uniquely suitable for absorbing energy occasioned by an impact whereby the harmful effects of the impact can be substantially diminished.

It is an additional object of this invention to provide a suspension means which absorbs energy in a manner such that light, intermediate and heavy blows can be accommodated with maximum safety.

It is a still further object of this invention to provide a suspension means which is particularly suitable for use in headgear constructions whereby the detrimental effects of blows directed at the head can be reduced or eliminated.

These and other objects of this invention will appear hereinafter and, for purposes of illustration but not of limitation, specific embodiments of this invention are shown in the accompanying drawings in which.

Figure 1:
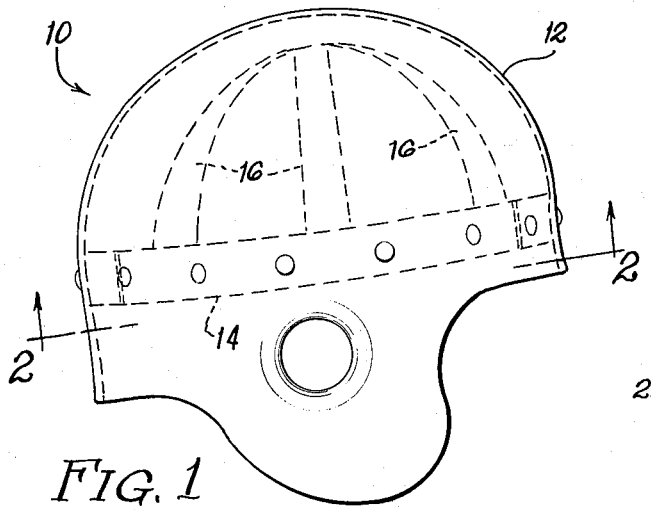
FIGURE 1 is an elevational view of a headgear construction including the suspension means of this invention.

The suspension system of this invention is incorporated in padding constructions whereby the detrimental effects of blows directed at the wearer of the padding can be reduced or eliminated. In constructions employing the suspension system, a relatively stiff outer portion surrounds an inner portion which is closely adjacent to or which contacts the wearer. The suspension system which connects the inner and outer portions includes two or more energy absorbing portions whereby the detrimental effects of blows can be absorbed in stages. A first portion of the suspension means is adapted to be put into tension immediately upon application of a force and this first portion is capable of absorbing a predetermined amount of energy. At least one additional portion completes the suspension system. This additional portion is also adapted to be put into tension; however, it is so designed whereby energy produced beyond the aforementioned predetermined amount will be absorbed by the additional portion. The suspension means comprising the respective portions are usually located at a plurality of points in the protective padding construction.

The suspension means of this invention are particularly suitable for the construction of headgear, for example of the type worn by football players. The instant invention will be explained in detail with reference to its application in the manufacture of headgear. In such constructions, the conventional substantially rigid shell of the headgear comprises the aforementioned outer portion while the cradle within the shell comprises the aforementioned inner portion. The suspension means are located between the cradle and shell and these suspension means serve to hold the assembly together.

In the accompanying drawing, there is illustrated a headgear 10 which comprises a rigid outer shell 12. Located within the shell is a sweatband 14 designed to embrace the head of the wearer. A plurality of strips 16 are connected to the sweatband, and these strips extend to a central portion of the headgear whereby a crown configuration 18 is achieved. The combination of the strips 16 and the band 14 provides for proper fitting of the headgear on the head of the wearer. A chin strap, not shown, is conventionally provided for holding the headgear in position.

The suspension means of the headgear 10 are generally designated by the numeral 20. As indicated, these suspension means interconnect the band 14 and the shell 12. Rivets or other fastening means 22 serve to secure one end of the suspension means to the shell while the other ends of the suspension means may be stitched to the band.

Figure 5:
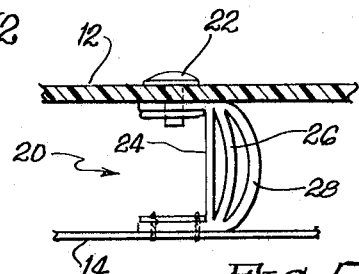
FIGURE 5 is an enlarged fragmentary view of an alternative form of suspension system; and, FIGURE 6 is an enlarged fragmentary view illustrating the system of FIGURE 5 as it appears in tension.
Figure 6:
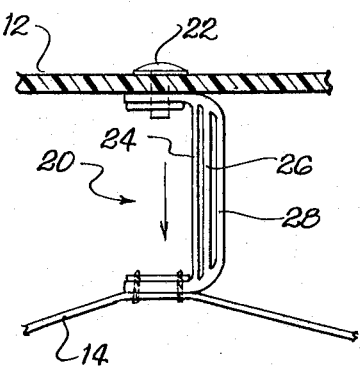

The details of the suspension means of the headgear 10 are shown in FIGURES 5 and 6. Each of the suspension means comprises a first portion 24 and additional portions 26 and 28. Each of the portions 24, 26 and 28 assumes the form of a short flexible strip. The portion 24 is the shortest of the strips, and in the normal unstressed position shown in FIGURE 5, this portion is more or less taut although no significant tension is applied thereto. The additional portion 26 is longer than the portion 24 and is more or less limp in its normal position. The last portion 28 is the longest portion and, accordingly, it is also limp in its normal state.

FIGURE 6 illustrates the construction as it appears when subjected to certain tension. It will be apparent that the application of force to the headgear will initially result in tension being built-up in the portion 24. This portion will, therefore, absorb energy up to a certain predetermined point. When this point is reached, the portion 26 will be subjected to tension, and this portion will, therefore, begin to absorb energy. Under conditions of severe impact, the portion 28 will also come into play, and this situation is illustrated in FIGURE 6.

Figure 2:
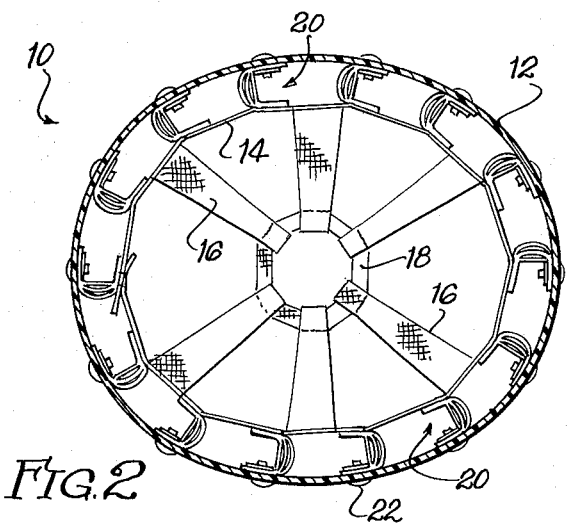
FIGURE 2 is a cross-sectional view of the headgear construction taken about the line 2—2 of FIGURE 1.

FIGURES 5 and 6 illustrate what can happen to an individual suspension means of the type shown in FIGURE 2. It will be apparent, however, that several of the suspension means will come into play simultaneously in an arrangement of the type illustrated. The suspension means which are on the side of the headgear opposite the point of force application will be the ones which are placed in tension. The suspension means on the same side as the force application will collapse and will not take part in the absorption of energy to any significant extent.

It will be noted that the suspension means also provide protection against blows directed at the top of the headgear or at intermediate points over the headgear surface. The strips 16 and the crown configuration 18 embrace the head so that tension will be exerted in at least some of the suspension means irrespective of the direction of force application. It will be understood, however, that suspension means located at different levels in the assembly are also contemplated.

Figure 3:
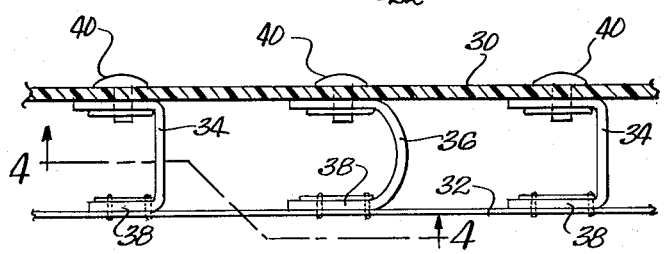
FIGURE 3 is an enlarged fragmentary view illustrating one form of suspension system.
Figure 4:
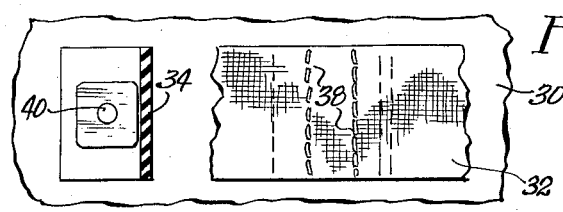
FIGURE 4 is a detail sectional view taken about the line 4—4 of FIGURE 3.

FIGURES 3 and 4 illustrate one possible alternative form of the invention. In this situation, a substantially rigid outer member 30 covers an inner band 32. Short flexible strips 34 and 36 are arranged in alternating fashion between the member 30 and the band 32. The ends of the strips are stitched to the band 32 at 38 and are attached to the member 30 by means of fasteners 40.

It will be noted that the strip 36 is longer than the strips 34. This type of arrangement operates in a manner similar to the operation referred to in the description of FIGURES 5 and 6 since the strips 34 will come into play to absorb initial portions of energy. The longer strips 36 will only come into play when the force applied is sufficient to stretch the strips 34 to a point exceeding the free length of the strips 36. It will be apparent that three or more different lengths of strips could be employed in various alternating patterns in order to achieve the results of this invention.

There are various ways in which suspension systems can be designed to achieve the results which can be achieved with the illustrated embodiments. In the structure shown in FIGURES 5 and 6, the suspension means 20 are formed from an integral length of material. Each of the portions 24, 26 and 28 has common ends and the means 20 is separated across its width to provide the desired portions. Suspension means of this type can be produced by extruding continuous lengths having a cross section of the type illustrated in FIGURE 5. Butyl rubber is considered a particuarly suitable material for an application of the nature contemplated herein; however, other materials including natural and synthetic rubber, and natural and synthetic fabrics having a degree of flexibility are also contemplated. Materials which have a low coefficient of restitution are particularly suitable for use in constructions of the type described.

It will be obvious that the arrangement of the suspension means 20 can be accomplished by employing three distinct members for the portions 24, 26 and 28. These members could be of the same material, or they may be of different materials whereby different energy absorbing characteristics can be provided. It is also to be noted that the portions 26 and 28 can have a different thickness than the portion 24, and it will be apparent that such variations in the cross-sectional area provide a desirable means for varying the resistance to stretch of the various additional portions. The cross-sectional areas may increase in a proportional manner as their lengths, in a relaxed state, increase. However, uniform and decreasing cross-sectional areas are also clearly contemplated since the very fact that additional portions are provided ensures an increased energy absorbing capability with respect to intermediate and heavy blows.

The arrangement of the portions 24, 26 and 28 is shown whereby portions of greater length are immediately adjacent shorter portions. It will be understood, however, that this arrangement is provided only for convenience and other suitable combinations are clearly conceivable.

In the use of strips of different lengths in alternating locations, there are also many possible variations available. The longer strips are preferably greater in cross section or at least formed of different materials whereby energy can be absorbed at a more rapid rate in the later stages of impact. Variations in the spacing between the adjacent strips are also clearly possible, and it will be understood that combinations of the strips shown in FIGURES 5 and 6 and those shown in FIGURES 3 and 4 are also considered a part of this invention.

In a typical application of this invention, suspension means formed of Butyl rubber are located at intervals of about two inches around the periphery of a headgear in the manner shown in FIGURE 2. In such an application, the free lengths of the portions 24 are about 5/8 inch and the portions 26 and 28 are 1/8 and 1/4 inch longer, respectively. The portions 24 have a width of about one inch and a thickness of 7/16 of an inch while the portions 26 and 28 are the same width and are 1/32 and 1/16 inch thicker, respectively. It will be appreciated that this illustration is provided only for the purpose of defining an operative embodiment, and many variations from this embodiment are capable of being produced. The particular arrangement employed would depend to a large extent on the protective construction in which the suspension means are utilized and on the materials employed.

The constructions described herein are considered ideally suitable for use where blows of varying intensity can be expected. The use of the distinct elements in the construction which are individually capable of absorbing energy to different degrees is, therefore, an ideal arrangement for contact sports such as football. Light, intermediate and heavy blows are necessarily encountered by those engaged in this sport, and the arrangement of this invention provides a unique means for accommodating such variable conditions.

The above description and examples have been concerned with protective constructions which are worn by individuals. The suspension means of this invention will also find application on objects which are conventionally padded in order to avoid injury to persons striking the objects. In such a situation, the suspension means would be located between the objects and the shells surrounding the objects.

It will be understood that a large variety of changes and modifications may be made in the systems described above which provide the characteristics of this invention without departing from the spirit thereof particularly as defined in the following claims.

That which is claimed is:

1. In a headgear construction adapted to protect against the detrimental effects of blows directed at the head of the wearer, said construction including an outer protective shell and cradle means located within the shell for contact with the head, the improvement comprising a plurality of suspension means connecting said cradle means so said shell, said suspension means being located at a plurality of different locations in said headgear to protect against blows directed at different locations, each of said suspension means including at least two portions comprising a first portion adapted to be put into tension immediately upon application of force to the headgear and being capable of absorbing a predetermined amount of energy, and at least one additional portion adapted to be put into tension and capable of absorbing energy produced beyond said predetermined amount.

2. In a headgear construction adapted to protect against the detrimental effects of blows directed at the head of the wearer, said construction including an outer protective shell and cradle means located within the shell for contact with the head, the improvement comprising suspension means connecting said cradle means to said shell, said suspension means including at least two portions comprising a first portion adapted to be put into tension immediately upon application of force to the headgear and being capable of absorbing a predetermined amount of energy, and at least one additional portion adapted to be put into tension and capable of absorbing energy produced beyond said predetermined amount, and wherein the opposite ends of each portion of said suspension means are attached to said cradle and said shell respectively, said ends having a common point of attachment.

3. A construction in accordance with claim 2 wherein the end portions of said suspension means are integrally formed of the same material.

4. A construction in accordance with claim 1 wherein the opposite ends of each portion of said suspension means are attached to said cradle and to said shell respectively, said portions being located in alternating, spaced-apart positions within said headgear.

5. In a headgear construction adapted to protect against the detrimental effects of blows directed at the head of the wearer, said construction including an outer protective shell and cradle means located within the shell for contact with the head, the improvement comprising a plurality of suspension means located at spaced-apart points within said construction, said suspension means connecting said cradle means to said shell, each of said suspension means including at least two portions comprising a first portion adapted to be put into tension immediately upon application of force to the headgear and being capable of absorbing a predetermined amount of energy, and at least one additional portion adapted to be put into tension and capable of absorbing energy produced beyond said predetermined amount.

6. A construction in accordance with claim 5 wherein the opposite ends of each strip are attached to said cradle and said shell respectively, and wherein each portion of said suspension means comprises an individual strip, with said portions being mounted in alternating fashion within said headgear.

7. In a protective padding construction adapted to protect against the detrimental effects of blows directed at the wearer of the padding, said construction including a relatively stiff outer portion and an inner portion for contact with the wearer, the improvement comprising a plurality of suspension means located at spaced-apart points within said construction, each of said suspension means including at least two portions comprising a first portion adapted to be put into tension immediately upon application of force to said construction and being capable of absorbing a predetermined amount of energy, and at least one additional portion adapted to be put into tension and capable of absorbing energy produced beyond said predetermined amount.

8. A construction in accordance with claim 7 wherein said suspension means comprise short flexible strips, said first portion being shorter than said additional portion with any succeeding portions being proportionally longer than an immediately preceding portion.

9. A construction in accordance with claim 8 wherein said first portion and an adjacent additional portion are formed of the same material and wherein said first portion has a smaller cross-sectional area than said additional portion.

10. A construction in accordance with claim 7 wherein said suspension means comprise short flexible strips, said first portion being shorter than any additional portion and said portions being positioned in alternating locations within said construction.

11. A construction in accordance with claim 10 wherein said additional portions comprise strips of greater cross-sectional area than said first portion.

12. In a headgear construction adapted to protect against the detrimental effects of blows directed at the head of the wearer, said construction including an outer protective shell and cradle means located within the shell for contact with the head, the improvement comprising suspension means connecting said cradle means to said shell, said suspension means comprising short flexible strips formed in at least two portions and including a first portion adapted to be put into tension immediately upon application of force to the headgear and being capable of absorbing a predetermined amount of energy, additional portions of said suspension means being adapted to be put into tension and being capable of absorbing energy produced by said force beyond said predetermined amount.

13. A construction in accordance with claim 12 wherein said first portion is shorter than any additional portion and wherein all additional portions are proportionally longer than an immediately preceding portion.

14. A construction in accordance with claim 13 wherein said first portion and any adjacent additional portions are formed of the same material and wherein said first portion has a smaller cross-sectional area than an immediately adjacent additional portion, with any successive additional portions having proportionally increasing cross-sectional areas.

15. In a protective padding construction adapted to protect against the detrimental effects of impact, said construction including a relatively stiff outer portion and an inner portion, the improvement comprising a plurality of suspension means located at spaced-apart points within said construction, each of said suspension means including at least two portions comprising a first portion adapted to be put into tension immediately upon application of force to said construction and being capable of absorbing a predetermined amount of energy, and at least one additional portion adapted to be put into tension and capable of absorbing energy produced beyond said predetermined amount.

16. In a headgear construction adapted to protect against the detrimental effects of blows directed at the head of the wearer, said construction including an outer protective shell and cradle means located within the shell for contact with the head, the improvement comprising a plurality of suspension means located at spaced-apart points within said construction, said suspension means connecting said cradle means to said shell, each of said suspension means including at least two portions comprising a first portion adapted to be put into tension immediately upon application of force to the headgear and being capable of absorbing a predetermined amount of energy, and at least one additional portion adapted to be put into tension and capable of absorbing energy produced beyond said predetermined amount, and wherein said suspension means comprise short strips with the opposite ends of each strip being attached to said cradle and said shell respectively, said ends having a common point of attachment.

References Cited by the Examiner

UNITED STATES PATENTS

| | | | |
|---|---|---|---|
| 1,251,537 | 1/1918 | Kempny | 2—6 |
| 2,197,174 | 4/1940 | Crosby | 2—6 |
| 2,758,305 | 8/1956 | Gross | 2—3 |
| 2,910,702 | 11/1959 | Austin et al. | 2—3 |

FOREIGN PATENTS 1,193,925  5/1959  France.

JORDAN FRANKLIN, *Primary Examiner.*